United States Patent Office 2,734,824
Patented Feb. 14, 1956

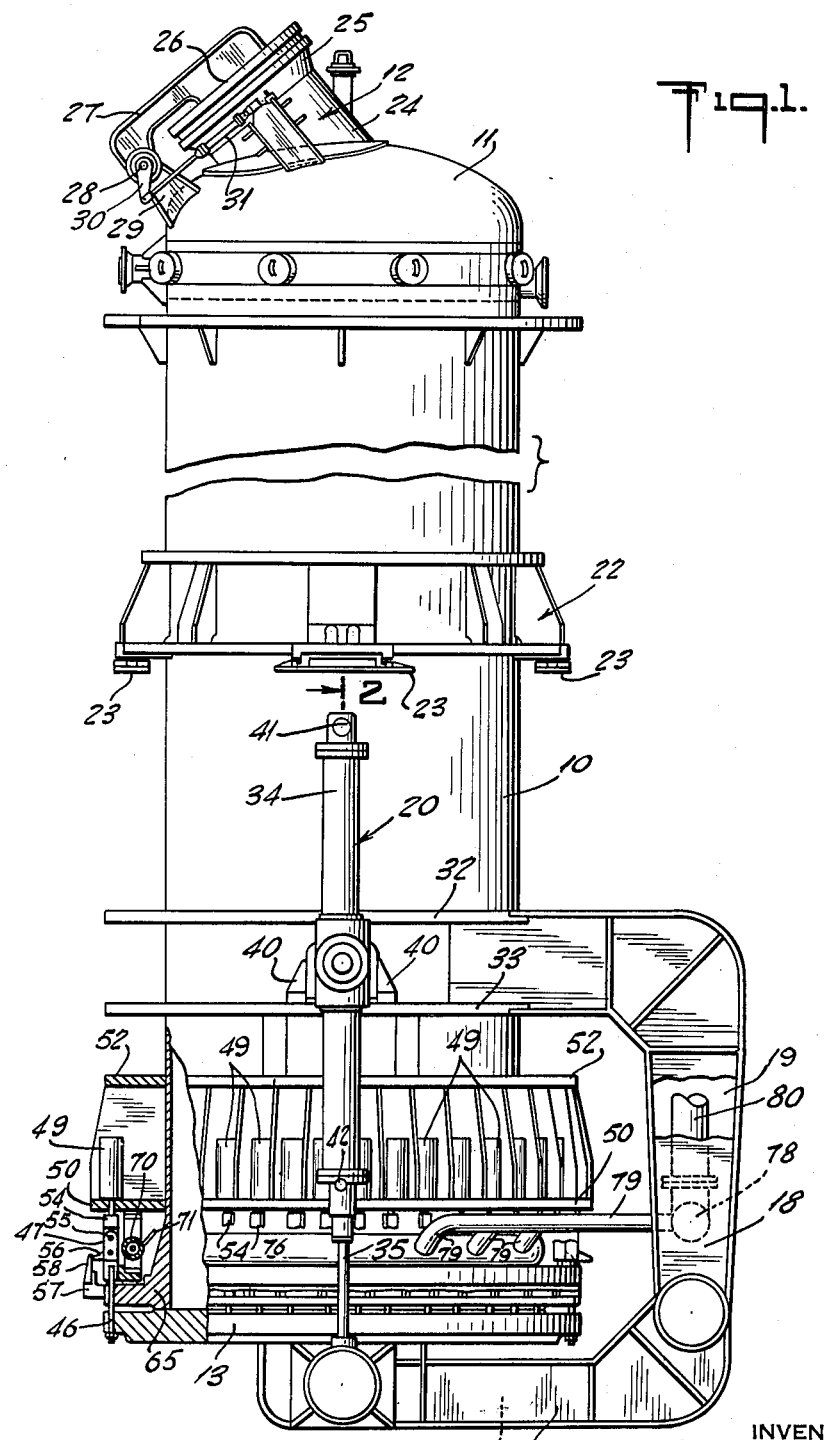

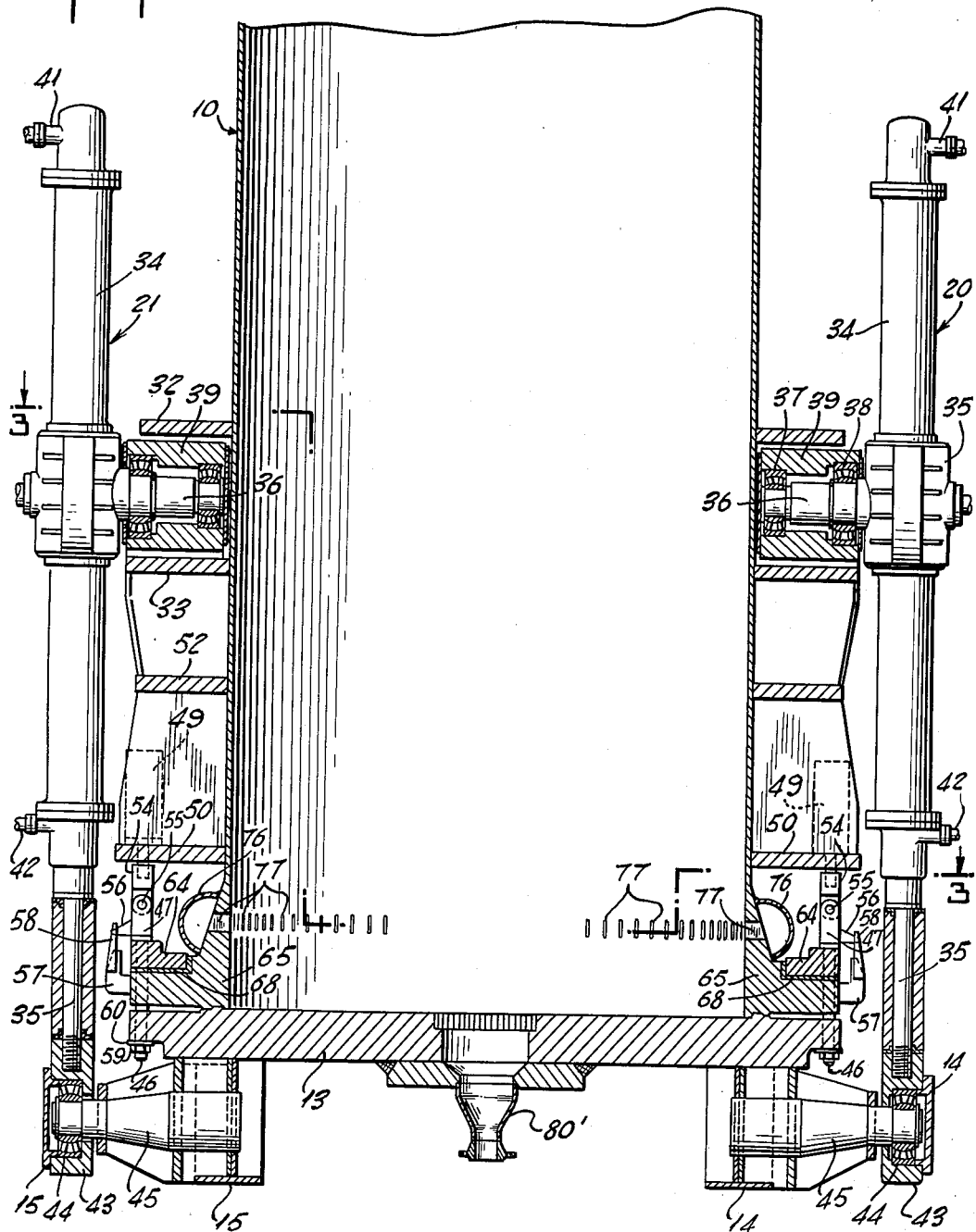

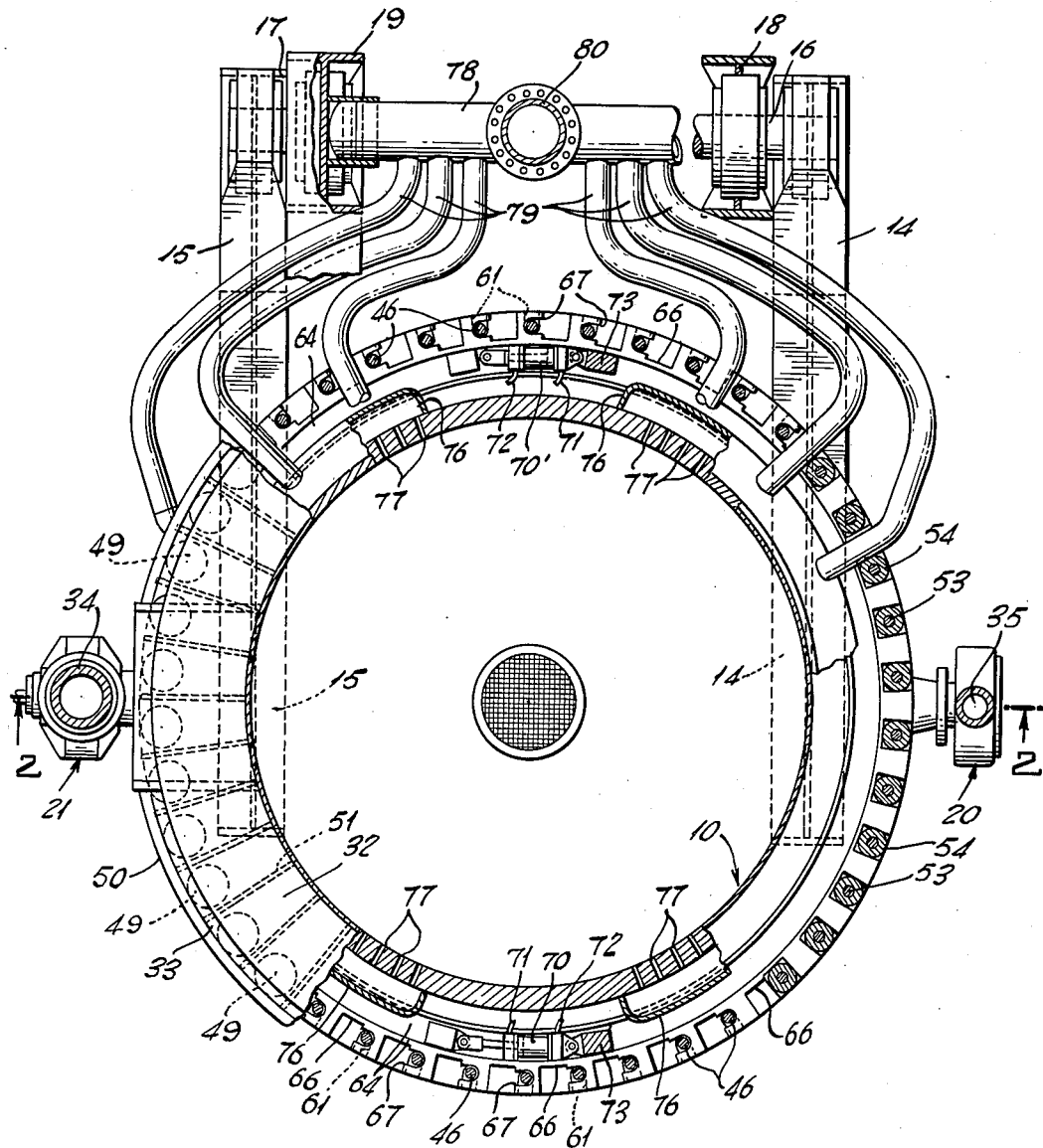

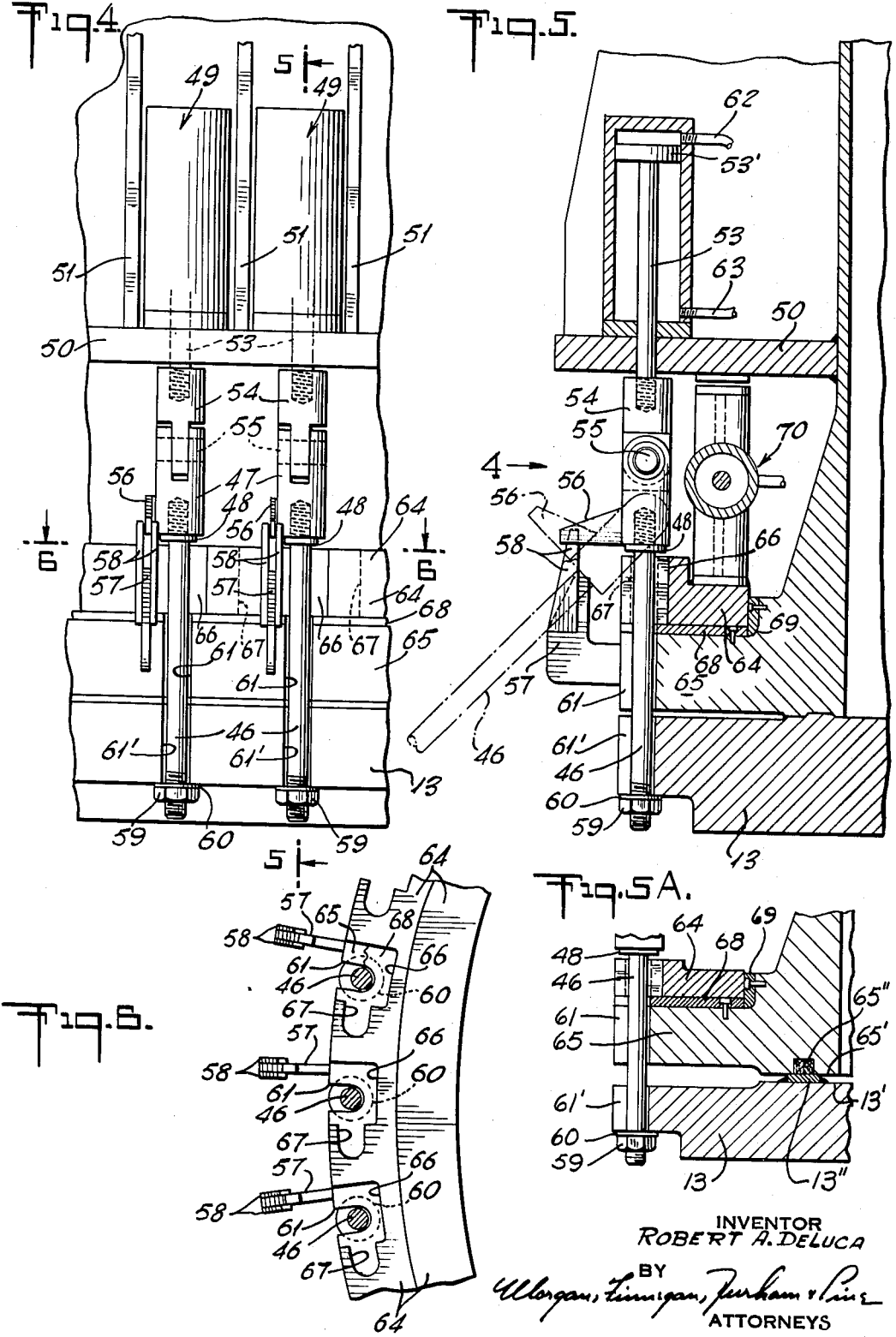

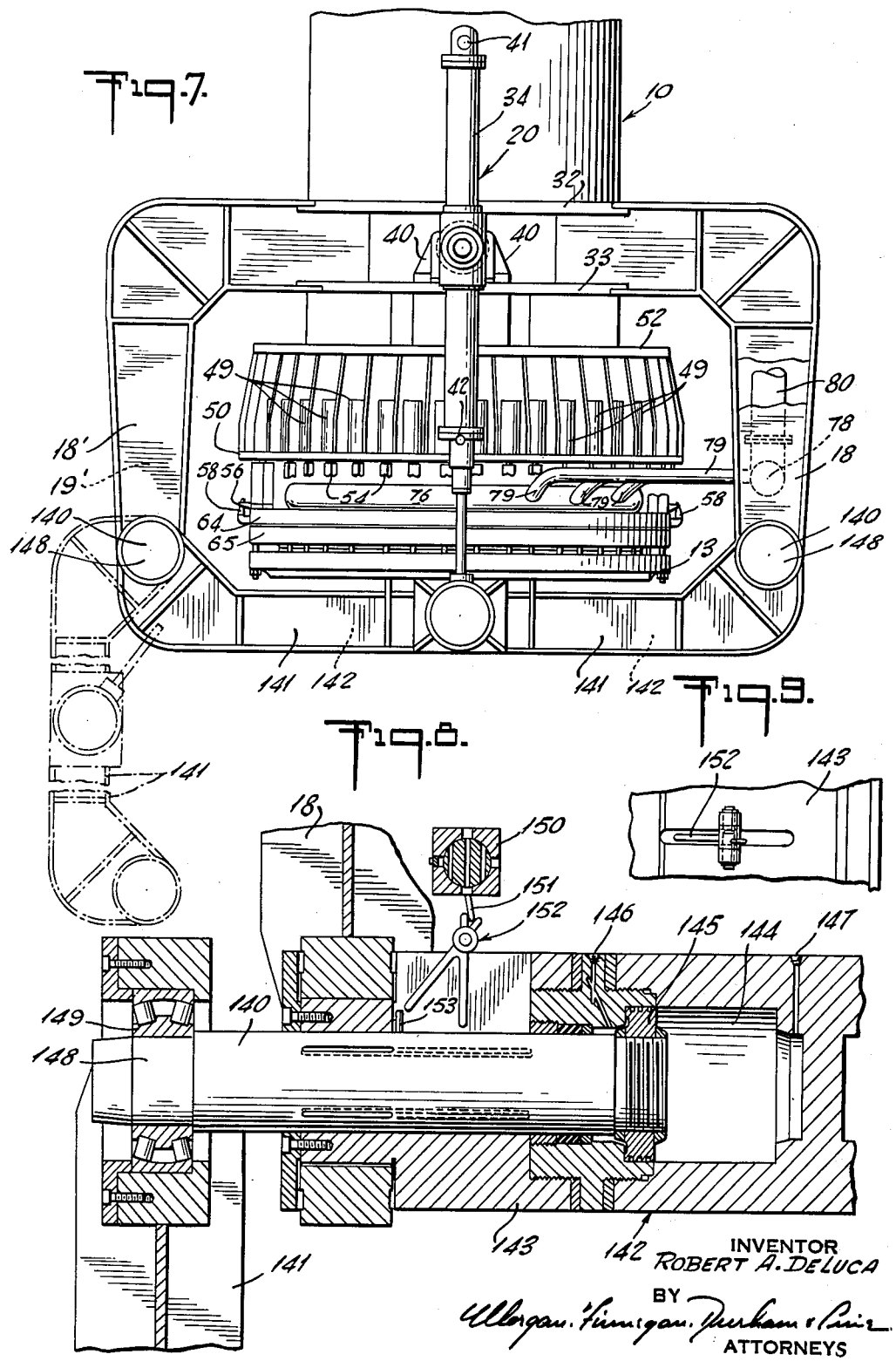

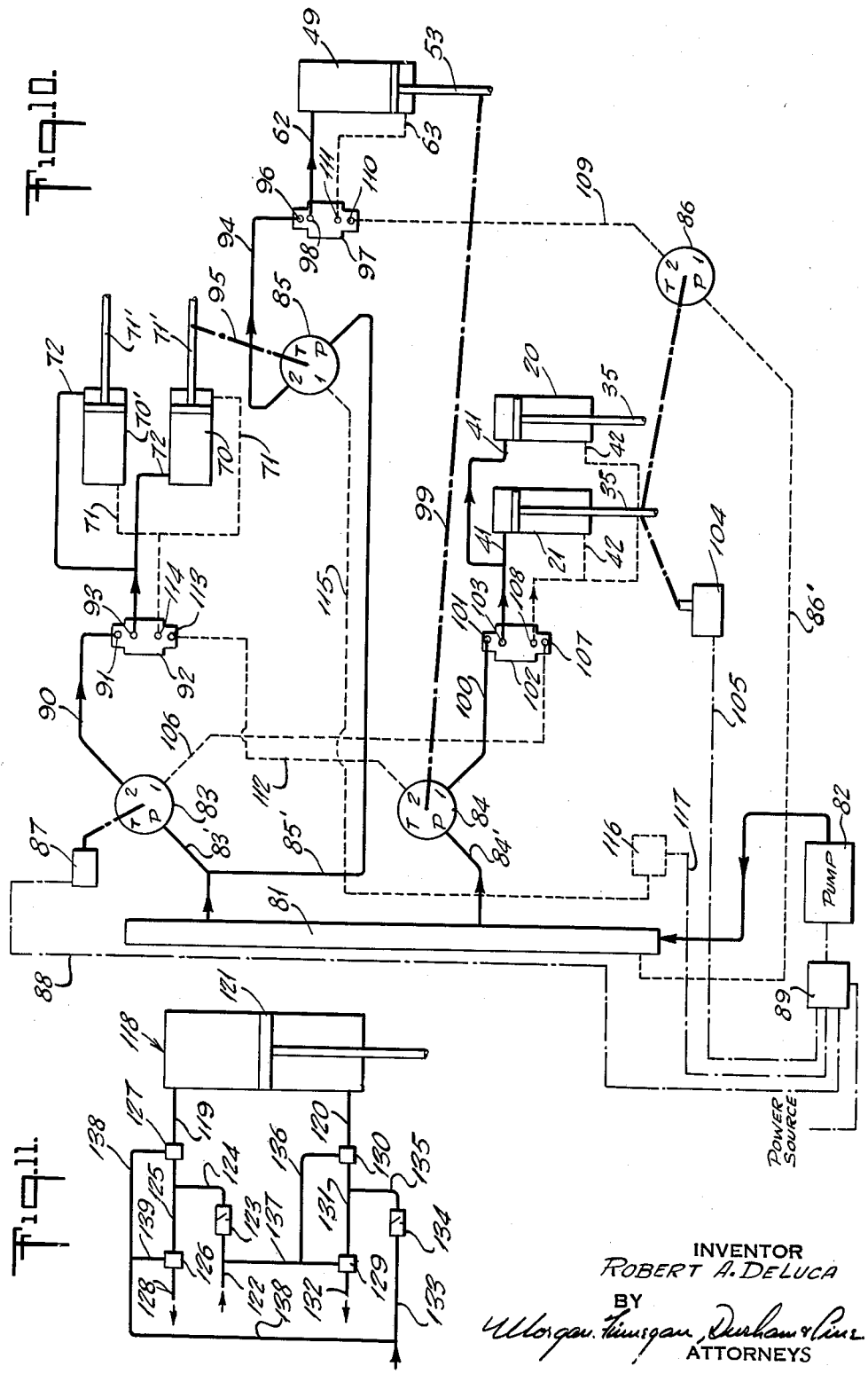

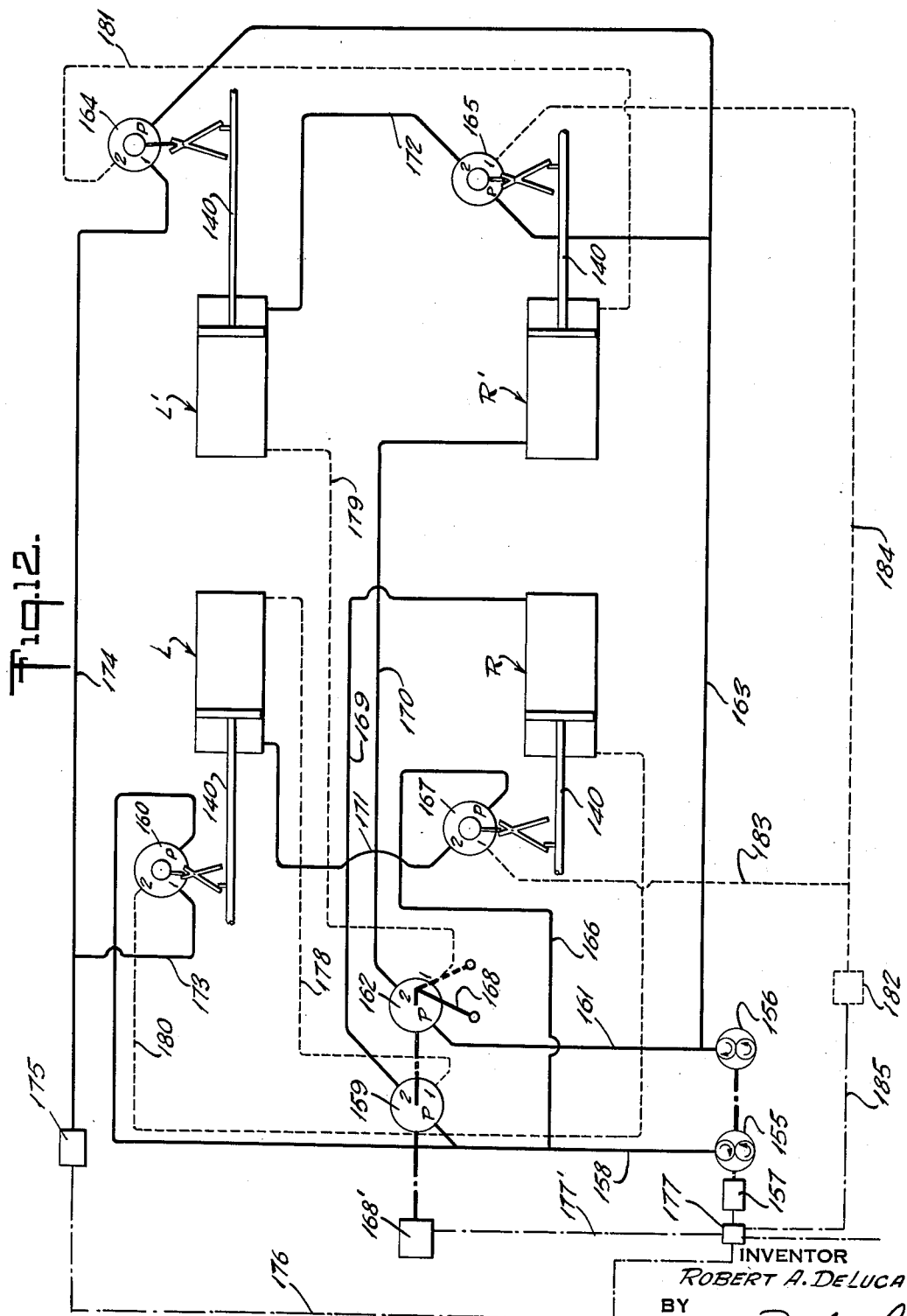

2,734,824

PRESSURE VESSELS

Robert A. De Luca, Newton, Mass., assignor, by mesne assignments, to Great Northern Paper Company, Millinocket, Maine, a corporation of Maine Application October 18, 1954, Serial No. 462,827

15 Claims. (Cl. 92—7)

This invention relates to pressure closures and more particularly to a fully automatic pressure closure for large vessels such as digesters for treating pulpwood in log or chip form as in the manufacture of paper.

Many manufacturing processes, particularly in the paper and chemical industries require the utilization of large tanks of one type or another for the treatment of materials, mixture of liquids and solids and the like. In many cases it is desirable to employ a vertical tank having top and bottom closures. In these instances the attainment of an effective and secure bottom seal presents considerable difficulty especially when the entire bottom is to be opened as in the treatment of pulpwood in the manufacture of paper so that the tank can be emptied quickly and thereby avoid the inconveniences and problems entailed with conventional valving devices. Accordingly one object of the invention is the provision of a fully automatic bottom closure for tanks that will enable the attainment of a positive secure seal that will support large loads and at the same time cannot be accidentally opened by failure of the automatic control system. To this end the invention provides automatically operable means to open and close the bottom closure and means for securing the closure in place, against accidental release, that are separate and distinct from the opening and closing devices. With this arrangement the closure member is at all times under control of one or more locking members so that failure of the control system will not result in damage to the equipment or injury to the operators thereof.

Another object of the invention is the provision of an improved bottom closure for tanks wherein said closure may be swung open about selected pivots to discharge the material in the tank or container in the desired direction.

Still another object of the invention is the provision of a new and improved structure for supporting a bottom closure member having automatically operable pivot means about which the closure may be moved.

A still further object of the invention is the provision of a control system for opening and closing bottom closures for tanks that is characterized by its simplicity, dependability and reliability and wherein the closure is at all times under complete control of the operating means.

Still another object of the invention is the provision of a new and improved digester having fully automatic means for operating the closure members.

The above and other objects and advantages of the invention will become more apparent from the following description and accompanying drawings forming part of this application.

In the drawings:

Fig. 1 is a side elevation of a digesting tank in accordance with the invention and showing the bottom and top closures therefor;

Fig. 2 is a cross sectional view of Fig. 1 taken along the line 2—2 thereof;

Fig. 3 is a cross sectional view of Fig. 2 taken along the line 3—3 thereof;

Fig. 4 is a fragmentary elevational view of the bottom closure locking means of the embodiment of Fig. 1;

Figs. 5 and 6 are cross sectional views of Fig. 4 taken along the lines 5—5 and 6—6 thereof respectively;

Fig. 5a is a fragmentary view in section corresponding generally to the showing of Fig. 5 but with a modified form of sealing device between the bottom cover and the vessel;

Fig. 7 is a modification of the bottom closure shown in Fig. 1;

Fig. 8 is a cross sectional view of a retractable hinge pin utilized with the embodiment of the invention shown in Fig. 7;

Fig. 9 is a fragmentary top view of the hinge pin shown in Fig. 8;

Fig. 10 is a schematic diagram of the control apparatus for opening and closing the bottom closure member of Figs. 1 and 7;

Fig. 11 is a diagram of a preferred valve arrangement for the operation of the hydraulic devices of Figs. 10 and 12; and Fig. 12 is a circuit diagram of the hydraulic control for hinge pins used in the embodiment of the invention shown in Fig. 7.

While the invention now to be described may be employed in any type of apparatus requiring an automatically operable bottom closure for tanks, for convenience it will be discussed in connection with a pulpwood digesting apparatus used in connection with the manufacture of paper.

Referring now to the drawings and specifically to Figs. 1 to 6 inclusive, the autoclave or pressure vessel includes a vertically disposed tank 10 having a dome-shaped top 11 with a hydraulically operated top closure means 12. The bottom of the tank 10 has a bottom closure member 13 of a diameter approximately equal to the diameter of the tank. The bottom closure member is supported by a pair of arms 14 and 15 pivoted by means of pins or trunnions 16 and 17 to a pair of vertically disposed bracket members 18 and 19. The closure member 13 is moved about the pivots 16 and 17 when opened and closed under the action of a pair of hydraulically operated cylinders 20 and 21.

The entire assembly may be supported by any suitable means as for instance the ring shaped structure 22 fixedly attached to the tank 10 about the central portion thereof and having a number of elongated bracket members 23 secured to the lower surface thereof for engaging suitable structural members in a building. Normally, by reason of the size of the tank these supporting members 23 may engage the beams of a floor in the building so that the top of the tank is accessible from one level or floor and the tank may be discharged through the bottom at some lower level or floor upon opening of the closure member 13.

The top closure means 12 has a short neck-like portion 24 secured to the dome 11 and opening into the tank 10. The outer end of the neck 24 is provided with a conical flange 25 having a cooperating top closure member or lid 26 adapted to seal the opening. The lid 26 may be supported by a U-shaped bracket member 27 pivoted at 28 to a stand-off bracket 29 which in turn may be secured in any suitable fashion to the dome 11 of tank 10. The pivot pin 28 is preferably fixed relative to the U-shaped bracket member 27 and rotatably mounted in the stand-off brackets 29. The outer end of this pin 28 carries an operating arm lever 30 coupled with a hydraulic cylinder 31 which functions to automatically open and close the lid 26. The positioning of the lid 26 in the closed position utilizes the weight of the lid to effect, at least in part, a tight seal with a flange opening 25. When the lid is opened it moves beyond a vertical position so that there is no possibility of accidental closing of the lid during the loading operation.

Referring now to the bottom closure member and associated operating structure, the main supporting brackets 18 and 19 are secured to the tank 10 by a pair of surrounding collars 32 and 33 and are spaced apart on one side of the tank to form in effect two spaced pivots or trunnions for the support of the closure member 13. While the closure member 13 is rigidly secured to the brackets 14 and 15 which in turn are pivoted at 16 and 17 to the basic support members 18 and 19, the movement of the bottom closure member from the open to a closed position about the pivots 16 and 17 is maintained under the control of the vertically disposed lifting cylinders 20 and 21. Each of these cylinders is provided with an elongated body part 34 which forms the cylinder for a reciprocable piston which actuates the piston rod 35 extending from the lower end of the body 34. The body or cylinder 34 is supported by a surrounding collar 35 positioned midway thereof and having a laterally extending shaft or axle 36 rotatably supported by means of a pair of bearings 37 and 38 disposed within the housing 39. The housing 39 is in turn supported between the flanges 32 and 33 surrounding the body 10 of the digester and is secured to the lower flange by suitable bracket members 40. The body or cylinder portion 34 of the bottom closure member lifting cylinders is provided with a pair of fluid connectors 41 and 42 for the connection of the cylinders with fluid lines to raise and lower the cover. Each piston rod 35 carries on its lower end a journal 43 having a bearing 44 therein for receiving a transverse shaft member or pivot 45. One of these shafts or pivots 45 is fixedly secured to the bracket member 14 and extends outwardly therefrom for cooperation with the cylinder 20 while a corresponding pin 45 is secured to the companion bracket member 15 and cooperates with the piston rod 35 of the cylinder 21. With this arrangement introduction of oil into the connectors 42 of the cylinders 20 and 21 will function to retract the rods 35 and raise the bottom closure member to the closed position as shown on the drawings. To open the bottom closure member fluid is introduced into the upper ends of the cylinders 20 and 21 and released from the connectors at the lower ends thereof under controlled conditions so that in effect the pressure under which the oil or other fluid enters the upper ends of the cylinders actually controls the rate at which the bottom closure member is lowered.

While the cylinders 20 and 21 will have sufficient power to raise and lower the closure member 13, in view of the substantial loads that are to be carried by the bottom closure member it is important that suitable locking and sealing means be provided that will prevent any accidental opening of the bottom closure member during the processing of material within the digester. The attainment of these ends is accomplished in part by a plurality of bolts 46 which are uniformly spaced about the body 10 of the digester and arranged to automatically engage the cover 13 when it is in its closed position.

More specifically, each bolt 46 is threadably secured at its upper end to a bifurcated member 47 and has a shoulder 48 which rests tight against the lower surface of the member 47 as may be observed more clearly in Fig. 4. Automatic actuating means for each bolt is provided in the form of a hydraulic cylinder 49 disposed on the upper side of a flange 50 and between the vertically disposed partitions 51 which connect the flange 50 with a second flange 52 which provides added support for the cylinders 49. The piston rod 53 of each cylinder extends through a cooperating opening in the flange 50 and threadably engages a bracket member 54 which is pivoted at 55 to the bifurcated member 47. The cylinders 49 function to move their respective bolts downwardly and outwardly in the manner shown in dotted lines in Fig. 5 to permit opening of the closure member 13 while reverse action takes place upon closing the closure member 13.

Movement of each bolt 46 outwardly as shown in Fig. 5 is accomplished by a cam 56 fixedly attached to the bifurcated member 47 and arranged for cooperation with a cam actuating bracket consisting of a central member 57 which contacts the cam 56 and causes it to swing the bolt outwardly as the latter is lowered and a pair of side guides 58 which function to hold the cam 56 in line with the cam actuating member 57. The lower end of each bolt 56 is provided with a nut 59 and washer 60 for engagement of the underside of the edge of cover 13 as each bolt is moved into position in its associated radial slot 61' in the edge of the cover and corresponding slot 61 in the flange 65. In this way the bolts 46 provide the basic means for securing the bottom closure member in position after the latter has been closed through the action of the cylinders 20 and 21.

All of the cylinders 49 coupled with the bolts 46 are preferably operated in unison and each is provided with upper and lower fluid connecting means 62 and 63 respectively for operation of each piston 53' and the associated piston rod 53 as will be described.

The bolts 46 while providing the basic means for holding the closure member 13 in position on the bottom of the digester 10, would not prevent accidental opening of the closure member 13 during the treatment of material within the digester should the hydraulic pressure on cylinders 49 fail. In order to avoid such occurrence a locking ring 64 is provided and is disposed on top of the flange 65 forming part of the lower opening of the digester 10. The ring 64 is provided with a plurality of rectangularly shaped cut-out portions 66 in the edge thereof with each cut-out portion 66 having an area slightly larger than the horizontal area of the bifurcated member 47. In this way each member 47 may be moved into its associated cut-out portion 66 when the closure member 13 is to be opened by lowering of the bolts 46 as previously described. One edge of each of these cut-out portions 66 is provided with a narrow slot 67 slightly larger than the diameter of its associated bolt 46 for engaging the bolt and its upper collar 48 when in the locked position as shown in Figs. 4 and 5. The ring 64 is rotatably mounted on bearing plates 68 and 69 fixedly secured to the flange 65 and is adapted to be moved through an angle sufficient to move it from the position shown in Fig. 1 to a position wherein the slot 67 engages the body of the bolt 46.

Movement of the ring into and out of the locked position is accomplished by a pair of hydraulic cylinders 70 and 70' each having fluid connections 71 and 72. They are disposed between the locking ring 64 and the peripheral flange 50 surrounding the body of the digester 10. The bodies of cylinders 70 and 70' are each pivotally secured to a fixed element 73 on the digester while the piston rods are pivotally secured in any suitable manner to the ring 64. In this way operation of the two cylinders will function to move the ring through a predetermined angle to lock and unlock the bolts 46.

With the structure as described above, the closure member 13 when in the closed position is secured against accidental opening by the cooperation of the bolts 46 with the locking ring 64 so that when the ring is engaged with the bolts 46 and the upper shoulders 48 thereof, accidental loss of fluid pressure will not displace the ring and the closure member 13 will therefore be held by the bolts. In addition opening of the bottom closure member can only be effected by the restoration of fluid pressure to operate or rotate the ring 64 in which case fluid pressure will be restored for operation of cylinders 49 and 20 and 21 so that complete control of the bottom closure member will be obtained.

In addition to the foregoing elements of the digester it is also provided with a pair of arcuate manifolds 76 communicating with the inside of the digester 10 by means of a plurality of orifices 77. The manifolds 76 are connected to a primary manifold 78 through a plurality of conduits 79 which in turn is connected to an inlet pipe 80. In this way liquids or gases needed for the treatment of the mixture within the digester can be introduced and/or withdrawn. For purposes of testing the material within the digester a valved drain 80' is disposed on the underside of closure member 13 and generally centrally thereof.

Before discussing the structure of the modified embodiment of the invention as shown in Figs. 7 through 9 reference is made to Figs. 10 and 11 showing the electrical and hydraulic connections for the operation of the various cylinders heretofore described for the purpose of opening and closing the closure member 13.

For simplification and to facilitate an understanding of the operational diagram shown in Fig. 10, the solid lines represent hydraulic connections which are utilized to open the bottom closure member 13 while the uniformly dotted lines denote the hydraulic circuits used in closing the bottom closure member 13. Mechanical connections between the elements are represented by heavy dot dash lines and electric cables having one or more circuits therein are each denoted by light dot dash lines. While any suitable hydraulic fluid may be used to actuate the cylinders, a suitable oil or other similar liquid is preferred.

Hydraulic pressure for operation of the device is developed within a suitable manifold or tank 81 which is connected with a pump 82 preferably electrically operated and designed to develop pressures of the order of 2500 to 3000 pounds per square inch. The manifold 81 is connected with the pressure inlet of four separate fluid control valves 83, 84, 85 and 86 through fluid conduits 83', 84', 85' and 86' respectively. These valves may be of any suitable structure such as three or four way valves that will provide for the connection of the pressure line to one or the other of two fluid conduits connected therewith.

Considering now the operation of the device to move the closure member 13 from its closed position to its open position. The valve 83 is operated to connect its pressure port P with its outlet port 2 and in so doing switch 87 is actuated to close an electric circuit through the electric cable 88 and junction box 89 to turn on the pump 82. Fluid pressure will then flow from the manifold through the conduit 83' to the valve 83 and then outwardly through the conduit 90 to the port 91 of the piston operated control valve 92. The application of pressure to the port 91 uncovers an outlet port 93 on the control valve 92 and permits fluid under pressure to flow through the conduits 72 to the locking ring cylinders 70 and 70'. These cylinders then function to rotate the locking ring 64 in a counter clockwise direction as viewed in Fig. 3 of the drawings to disengage the slots 67 from the bolts 46 and center the cut-out portions 66 about the bolts 46 as shown in Fig. 6 of the drawings.

The actuation of cylinders 70 and 71' in this manner function to automatically operate the valve 85 to couple the output conduit 94 with the input pressure line 85'. This is accomplished by the mechanical connection 95 between the piston 70 and the valve 85 as illustrated. The pressure now developed in the conduit 94 is applied to the port 96 of the piston operated valve 97 which functions to uncover the port 98 and feed oil pressure via the conduit 62 to each of the bolt actuating cylinders 49 of which only one is illustrated. The pistons of the cylinders 49 are moved downwardly and at least one of the cylinders is mechanically coupled to the fluid valve 84 by a suitable mechanical connection 99. This action moves the valve 84 to connect the pressure port P thereof with the conduit 100 coupled to the inlet port 101 of the piston operated valve 102. In so doing the port 103 of the valve 102 is uncovered and whereby pressure is applied through the conduits 41 to the cylinders 20 and 21 to lower the cover. The piston rod 35 of one of the cover operating cylinders is mechanically coupled to a switch 104 which is moved to its off position and functions through the cable 105 and the junction box 89 to disconnect the power from the pump 82. The system is now at rest until it is desired to close the bottom closure member. It should be pointed out at this time that the return lines for the fluid in each of the cylinders have not been illustrated in order to simplify the drawings and that in actual practice separate returns for each cylinder to one or more reservoirs are provided to control the discharge of such fluid so that the actuation of the pistons is always under control of the fluid pressure. This structure will be described in connection with Fig. 11.

To close the closure member 13 after it has been opened the rotary valve 83 is moved to connect its pressure port P with the outlet conduit 106 which is connected to port 1 of the valve. This applies pressure to the inlet port 107 of the valve 102 which closes the port 103 and opens the port 108 to apply pressure via the conduits 42 to the bottom closure member lifting cylinders 20 and 21 to raise the bottom closure member and at the same time operate the fluid valve 86 to connect the pressure port P thereof with the outlet conduit 109. The conduit 109 feeds pressure to the inlet port 110 of the piston valve 97 which closes the port 98 and opens the port 111. Pressure is then applied through conduits 63 to each of the bolt lifting cylinders 49. Operation of these cylinders functions through the mechanical connection 99 to operate the valve 84 and couple the pressure port P with port 2 to the conduit 112 connected with the inlet port 113 of the valve 92. This action closes the port 93 and opens the port 114 which applies pressure through the conduits 71 to the locking ring cylinders 70 and 70'. After the cylinders 70 and 70' have been operated to move the locking ring to the closed position one of the cylinders through a mechanical connection 95 operates the valve 85 to apply pressure from port P to port 1 which is connected through a conduit 115 to a pressure actuated switch 116. This switch is moved to the open position and functions through the electric cable 117 and the junction box 89 to shut down the pump 82.

From Figs. 4 and 5 it will be observed that the upper shoulder 48 of each bolt 46 is spaced slightly above the top surface of the locking ring 64 so that they do not interfere with the movement of the ring from the locked to the unlocked position. This is accomplished by manually adjusting the pressure on each of the bolts when the equipment is first assembled. To do this the bottom closure member is moved to the closed position with the bolts 46 disposed within the slots 61 of the bottom flange 65 and slots 61' in the closure member 13 and the locking ring 64 is moved to its closed position. With the hydraulic pressure on the cylinders 49 released each bolt is then prestressed to about 75,000 to 80,000 pounds per square inch by drawing up the nuts 60 with a suitable impact wrench. The precise stress to be placed on each bolt can be accurately determined by an extensometer so that uniform loading will be applied at all points on the closure member 13. With a hydraulic pressure of 2,500 to 3,000 pounds per square inch applied to the cylinders 49, the resulting load on each bolt is increased to approximately 95,000 pounds per square inch. This increased load stretches the bolts so that the shoulder 48 leaves the locking ring and enables it to be moved freely into and out of the locking position. In the event of hydraulic failure while the bottom closure member is in its closed and locked position each bolt will exert a pressure of the order of 80,000 pounds on the bottom closure member and thereby prevent any loss of the product from the digester.

In the modified form of bottom closure member sealing device shown in Fig. 5a, the raised surface portion 65' of the flange 65 is suitably concentrically recessed to receive a gasket 65" formed of asbestos or other suitable gasket material. The closure member 13 is provided with a raised surface portion 13' to which is welded or otherwise suitably secured an annular sealing ring 13" also concentric with the bottom closure member and the vessel 10. In this form of construction, when assembling the cover bolts, the cover is brought to the closed position without the gasket 65" in place. A shim of suitable thickness, for example 0.040 inch, is set so that the bottom of the bolt shoulder 48 is the shim thickness, for example 0.040 inch, above the top of the locking ring 64. The bolts 46 are then drawn hand-tight, pinned in position and the shims thereafter removed. The bolt pistons 53" are then extended to the open position in the cylinders 49, the cover 13 opened and the gasket 65" put into place in the recess in the raised surface 65". After closing the closure member 13, pressure is then applied to the bolt cylinders 49 and the gasket impressed entirely within its groove, thereby bringing the face of the sealing flange 13" into metal to metal contact with the raised flange surface 65" of the flange 65. During operation, therefore, the net clearance between the bolt shoulder and the locking ring is the shim thickness, for example, 0.40 inch, plus bolt stretch.

In the event of loss of hydraulic pressure, the closure member 13 can, therefore, recede the amount of the shim thickness from the face of the sealing flange 65". Hysteresis of the gasket 65" is greater than this amount and while this condition may allow slight leakage of vapor from within the vessel, the entire load is safely contained, providing sufficient time for the operator to reduce the pressure within the vessel to atmospheric.

While the operating diagram illustrated in Fig. 10 and described above is shown in its simplified form it was pointed out that in the preferred embodiment separate returns from each of the pistons is provided for maintaining unidirectional flow at all times. This procedure obviates the necessity of periodically bleeding the system to remove entrained air and enables all the pressure ports of all valves to be opened as illustrated, directly to the accumulated pressure to compensate for losses due to cylinder or valve leakage. If desired each accumulator may be equipped with a suitable pressure switch or switches which enable it to maintain the required circuit pressure at all times.

Fig. 11 shows a preferred arrangement for use with each of the hydraulic cylinders for closing and securing the closure member 13. For convenience only one cylinder, denoted by the numeral 118, is shown and is provided with a pair of fluid ports 119 and 120 for operating the piston 121 and its associated piston rod. When the piston is to be moved downwardly, as viewed in Fig. 11, fluid under pressure is applied through an inlet conduit 122. It then passes through a unidirectional flow valve 123 and conduit 124 to a conduit 125 connecting a pair of pilot operated valves 126 and 127, then through the pilot operated valve 127 which is connected with the conduit 119. The associated pilot valve 126 is connected with the return line 128. The lower fluid port 120 of the piston is arranged in a similar manner with a pair of pilot operated valves 129 and 130 coupled by a conduit 131 and the return line 132 being coupled with the valve 129. The pressure conduit 133 for moving the piston 121 upwardly is provided with a unidirectional flow valve 134 which is coupled by means of a conduit 135 with the conduit 131. In addition the pilot operated valves 129 and 130 are coupled with the pressure conduit 122 by conduits 136 and 137 and the pilot operated valves 126 and 127 are connected with the pressure line 133 by conduits 138 and 139. With this arrangement, pressure applied to the conduit 122 will operate the pilot valves 129 and 130 to provide unidirectional flow outwardly from the cylinder and thus permit the fluid below the cylinder 21 to flow into the return line 132. At the same time the unidirectional flow valve 134 block any return of the fluid through the pressure line 133. Since the pilot valves 126 and 127 are not actuated by pressure from the line 133 they will provide unidirectional flow toward the cylinder so that fluid will pass through the flow valve 123, conduits 124 and 125, the pilot valve 127 and conduit 119 to move the piston downwardly. The reverse operation takes place when pressure is applied to the line 133 which moves the piston 121 upwardly and discharges the oil through the return line 128.

Figs. 7 through 9 show a modified embodiment of the invention wherein the closure member 13 may be lowered in either one direction or the other by means of two pairs of pivots or trunnions situated at diametrically opposite positions relative to the tank. The bolts and associated actuating means, locking ring structure and lifting cylinders are identical in all respects to the embodiment previously described. It will be observed, however, that in addition to the vertically disposed fixed bracket members 18 and 19 as observed in Figs. 1 and 3 this embodiment of the invention includes a second set of such vertically depending members 18' and 19' which are diametrically positioned and are secured to the flanges 32 and 33 surrounding the digester 10 in the same manner as members 18 and 19. The lower ends of each pair of members 18, 19 and 18', 19' carry hydraulically operated pivot pins or trunnions 140 with the pins associated with each pair of said downwardly depending members being operated simultaneously to engage or release the cover supporting mechanism. The bottom closure member supporting members 14 and 15 of Fig. 1 are replaced in this embodiment of the invention with transverse members 141 and 142 which are spaced one from the other and are secured in any suitable manner to the underside of the closure member 13 and with their outer ends in alignment with the lower ends of the members 18 and 19 and 18' and 19'. The pivot pins 140 and the pivot actuating cylinders 142, a section of which is shown in Fig. 8, are disposed between and supported by the two pair of downwardly extending bracket members.

Referring now to Fig. 8 which illustrates one of the hydraulically operated pivot pins, it comprises a housing 143 having a chamber 144 therein and a piston 145 movable within said chamber. The piston 145 is secured to the pivot pin 140 and the latter is slidably retained within a suitable opening in the housing 143. Fluid inlet means 146 is provided for introducing fluid to the chamber 144 for moving the piston 145 and the pin 140 to the right as viewed in Fig. 8. Movement of the piston and pin to the left is accomplished by the admission of fluid to the pressure inlet 147 on the right hand side of the chamber 144. The outer end of the pivot pin 140 has a reduced section 148 which engages a self-aligning bearing 149 carried on the end of the transverse bracket member 141 to which the cover 13 is secured. In this way if the hydraulically actuated pins 140 associated with the downwardly depending members 18 and 19 are retracted to disengage the right hand ends of the transverse members 141 then upon actuation of the bottom closure member opening apparatus previously described the closure member 13 will move downwardly and pivot about the lower ends of the members 18' and 19' as illustrated in the dotted line position of Fig. 7. If desired, however, the pivot pins associated with the members 18 and 19 can be moved into engagement to the right hand ends of the members 141 and the pins associated with supporting members 18' and 19' can be disengaged in which case the bottom closure member will then be lowered to the right as viewed in Fig. 7.

In order to avoid the possibility of both sets of pivot pins 140 being simultaneously disengaged or engaged, the hydraulic operating system, which will be described, is arranged so that one set of pins will be engaged at all times. This is accomplished by means of interconnected control valves on each cylinder such as the valve 150 shown in Fig. 8. This valve is provided with an operating pin 151 which engages a suitable lever 152 that is moved backwardly and forwardly by the movement of the pivot pin 140 and the corresponding displacement of an actuator 152 carried thereby. Thus for example movement of the pivot pin 140 to the right will carry the actuator 153 to the right and angularly displace the lever 152 about its pivot. This action moves the operating pin 151 of the valve to the left.

The operation of the two sets of hydraulically operated pins 140 is shown in Fig. 12 wherein the symbols for the conduit wiring and mechanical connections are the same as those symbols used in connection with Fig. 10 previously described. For convenience the left hand cylinders for actuating the pins 140 and associated with the supporting members 18' and 19' are denoted by the letters L and L' and the set of cylinders associated with the supporting members 18 and 19 are denoted by the letters R and R'. The hydraulic pressure for the operation of the four cylinders is developed by a pair of identical gear pumps 155 and 156 driven by a common motor 157. When the motor is operated fluid under pressure is delivered by pump 155 through a conduit 158 to the pressure ports P of the rotary valves 159 and 160 and through the conduit 166 to the port P of valve 167. Similarly the pump 156 delivers fluid under pressure through conduit 161 to the pressure port P of rotary valve 162 and through conduit 163 to the pressure port of valves 164 and 165.

In order to effect the engagement of the right hand pivot pins as viewed in Fig. 7, which are actuated by the cylinders R and R', the operating handle 168 associated with valves 159 and 162 and motor starting switch 168' is moved to the right. Switch 168' closes a circuit through the cable 177' and junction box 177 to turn on motor 157. The fluid pressure generated by pumps 155 and 156 is applied to the port P of valves 162 and 159 where it is directed via the conduits 169 and 170 to the cylinders R and R' respectively to force the pistons outwardly and cause the associated pins 140 to engage their respective bearings 149 as described in connection with Fig. 8. This action effects operation of the rotary valves 167 and 165 and causes pressure to be applied to the outlet ports 2 of each of these valves. Since these ports are coupled by means of conduits 171 and 172 to the cylinders L and L' respectively, this causes them to be moved inwardly of each other to retract the left hand pivot pins 140. Movement of the left hand pins 140 inwardly actuates the valves 160 and 164 to connect the respective pressure ports with the port 1 of each of the valves. These ports are coupled by conduits 173 and 174 and cooperate to actuate a pressure switch 175 functioning through the electric cable 176 and junction box 177 to turn off the motor 157. When the operating handle 168 is moved to the left it positions the valves 159 and 162 to apply pressure to the ports 1 thereof and at the same time actuates switch 168' to again complete the motor energizing circuit. Ports 1 or valves 159 and 162 are connected by means of conduits 178 and 179 to apply pressure to the cylinders L and L' to move the pistons outwardly one of the other and cause the pivot pins 140 to engage their respective bearings. In so doing the valves 160 and 164 are operated to apply pressure to the conduits 180 and 181 which connect with the cylinders R and R' whereupon the pistons of these cylinders move inwardly to retract the associated pivot pins 140. Movement of the right hand pins inwardly actuates the valves 167 and 165 to apply pressure to the ports 1 thereof which are coupled one to the other and to a pressure switch 182 by means of conduits 183 and 184. Actuation of the pressure switch 182 functions through the electric cable 185 and the junction box 177 to again turn off the motor. With this arrangement only one set of pivot pins will be engaged at a time and operation to engage one set of pins automatically disconnects the other set of pins so that the equipment cannot be jammed. Similarly one set of pins will always be in engagement so that the entire weight of the closure member 13 cannot be accidently placed on the bottom closure member lifting cylinders 20 and 21.

The circuit of Fig. 12 while shown in simplified form in order to facilitate an understanding of the operation preferably includes an arrangement for each cylinder such as shown and described in connection with Fig. 11. In addition, the utilization of separate gear pumps 155 and 156 to actuate one cylinder of each set of cylinders effects positive operation thereof and insures simultaneous movement of both ends of each hinged pin assembly.

While only two embodiments of this invention have been illustrated and described, it is apparent that modifications, changes and alterations may be made without departing from the true scope and spirit thereof.

What is claimed is:

1. A closure for tanks comprising a closure member having a plurality of radial slots about the edge thereof, means including closure carrying members and trunnions for pivotally moving said closure member into and out of a closed position on said tank, a plurality of clamping bolts pivotally carried by said tank and adapted to engage the slots in said closure member when the latter is in the closed position, a locking ring rotatably supported by said tank and movable in one direction to engage said bolts to hold them in engagement with the closure member and movable in another direction to disengage said bolts and means for moving said bolts out of engagement with said closure member.

2. A bottom closure for tanks comprising a closure member having a plurality of slots about the edge thereof, means for moving said closure member into and out of a closed position, means on said tank for engaging the slots on said closure member and a locking ring movable in at least one direction to secure the last said means in position in said slots.

3. A bottom closure for tanks comprising a closure member having a plurality of slots about the edge thereof, a plurality of pivotally mounted rods carried by said tank in alignment with said slots, and enlarged member on the end of each rod for engaging the underside of the closure member when the rods are moved into said slots, hydraulic means for raising and lowering said rods, and means cooperating with said rods to move them out of engagement with said slots upon displacement downwardly to release the closure member and move them into engagement with the closure member upon upward movement of said hydraulic means.

4. A bottom closure for tanks comprising a closure member having a plurality of radially disposed slots about the edge thereof, a flange surrounding the lower edge of said tank and having a plurality of radially disposed slots aligned with the slots in said closure member, a plurality of hydraulic cylinders carried by said tank in alignment with the slots in said flange and said closure member, a bolt pivotally connected to and depending from each of said cylinders and adapted to be moved vertically in response to the operation of said cylinders, means on the lower end of each bolt for engagement to the underside of said closure member when said bolts are in engagement with their respective slots, a cam carried by each of said bolts and cam actuating means fixed relatively to said housing whereby movement of the bolts downwardly under the action of said hydraulic cylinders will cause the bolts to move out of engagement with said closure member and flange and movement of said hydraulic cylinders to carry the bolts upwardly will effect engagement thereof with the slots of said closure member and flange and secured said closure against said flange.

5. A bottom closure for tanks according to claim 3 including a rotatable ring surrounding said tank and supported by said peripheral flange, shoulders on the upper ends of said bolts and means for moving said ring in one direction to engage said bolts and underlie the shoulders thereof and movable in the other direction to disengage said bolts and permit them to be moved downwardly and outwardly in response to the action of said hydraulic cylinders.

6. A bottom closure for tanks comprising a closure member having a plurality of slots about the edge thereof, closure member supporting means including at least one supporting member extending beyond the edges of said closure member, trunnion bracket members secured to and extending from opposite sides of said tank, at least one trunnion carried by each of said trunnion bracket members for engagement with the ends of said closure member supporting member, said trunnions being adapted to be selectively engaged with and disengaged from the associated ends of said closure member supporting member, means including at least two hydraulic cylinders for moving said closure member toward and away from said tank about the selected trunnion and means including hydraulically actuated cylinders interconnected one with the other to effect positive engagement of one of said trunnions with one end of the closure member supporting member and disengagement of the other trunnion from the other end of said closure member supporting member.

7. A bottom closure for tanks having a peripheral flange about the lower edge thereof comprising a closure member, supporting means for said closure member including at least one supporting bracket extending beyond the edges of said closure member, at least two oppositely positioned trunnion bracket members secured to said tank and carrying retractable trunnions for cooperation with said supporting bracket, means including at least two hydraulic cylinders for raising and lowering said closure member about one of said trunnions and means including hydraulic cylinders for actuating said trunnions including connections between said cylinders to insure engagement of said trunnions with only one end of said supporting bracket at a time.

8. A bottom closure for tanks according to claim 7 including a closure member and flange each having a plurality of radially disposed slots, a plurality of pivotally mounted bolts carried by said tank for movement into and out of engagement with said slots and means including a plurality of hydraulic cylinders for moving said bolts into engagement with said slots and upwardly to secure said closure member in position on said tank.

9. A bottom closure for tanks according to claim 7 including a closure member and flange each having a plurality of radially disposed slots, a plurality of pivotally mounted bolts carried by said tank for movement into and out of engagement with said slots, means including a plurality of hyraulic cylinders for moving said bolts into engagement with said slots and upwardly to secure said closure member in position on said tank and means including a ring surrounding said tank and supported by said peripheral flange, said ring including means for moving it in one direction to engage said bolts to fixedly secure the closure member in position against said flange and movable in another direction to release said bolts for disengagement from said closure member.

10. A bottom closure for tanks comprising a closure member including means for moving it toward and away from said tank, a plurality of clamping means disposed about said closure member and carried by said tank, hydraulic means for moving said clamping means into and out of engagement with said closure member, a locking ring surrounding said tank for engagement with and disengagement from said clamping means and means for sequentially operating said locking ring, clamping means and closure member moving means to effect controlled engagement and disengagement of said closure member with said tank.

11. A bottom closure for tanks according to claim 10 wherein said locking ring, closure member moving means and clamping means are actuated by hydraulic cylinders having fluid conduits connected therewith and means including separate fluid conduits for delivering fluid to and removing it from said cylinders.

12. A digester for the treatment of pulpwood in log or chip form comprising a vertically disposed tank, a top closure member for said tank including hydraulically operated means for opening and closing it, a bottom closure member for said tank, means including a hinge for moving said bottom closure member through an arcuate path into and out of engagement with the bottom of said tank, a plurality of hydraulically operated clamping means about said tank for engagement with said bottom closure member when in the closed position thereof and means for locking said clamping means in the engaged position thereof with said closure member.

13. A digester for the treatment of pulpwood in log or chip form comprising a vertically disposed tank, a top closure member for said tank including hydraulically operated means for opening and closing it, a peripheral flange about the lower end of said tank having a plurality of radial slots therein, a bottom closure member, means including hydraulically actuated cylinders and a pair of axially aligned trunnions on one side of said bottom closure member for moving it through an arcuate path into and out of opposed position with said flange, said bottom closure member including a plurality of radially disposed slots aligned with the slots in said flange in said opposed position, a plurality of vertically disposed bolts positioned about said tank in alignment with said slots in said opposed position, a vertically disposed hydraulic cylinder associated with and supporting each bolt, a pivotal connection between each bolt and its associated cylinder, means on each bolt for moving it outwardly of the tank and out of engagement with the associated slots on the bottom closure and flange upon downward motion imparted by the associated cylinder and for moving it into engagement with the slots upon upward motion of said cylinder, a locking ring surrounding said tank and rotatably supported by said flange, a plurality of slots in said ring and hydraulic means for moving the ring in one direction to engage the bolts in said ring slots and support said bottom closure and in the other direction to release said bolts.

14. A digester according to claim 13 including fluid pressure generating means, a master control valve, a plurality of valves mechanically coupled with said cylinders and operable thereby and fluid lines coupled with said valves and cylinders for sequential operation of said cylinders.

15. A digester according to claim 13 wherein a set of axially aligned trunnions is provided on each side of said bottom closure member and means including a hydraulic cylinder is provided for each trunnion for automatically selecting one set of trunnions about which the bottom closure member is to be moved.

References Cited in the file of this patent

UNITED STATES PATENTS

| | | |
|---|---|---|
| 784,644 | Warner | Mar. 14, 1905 |
| 1,051,530 | Whalen | Jan. 28, 1913 |
| 1,625,373 | Panzl | Apr. 19, 1927 |
| 2,086,266 | Heve et al. | July 6, 1937 |
| 2,160,062 | Drake et al. | May 30, 1939 |
| 2,539,990 | Chapman et al. | Jan. 30, 1951 |
| 2,627,221 | Doyle | Feb. 3, 1953 |
| 2,680,684 | Obenshein | June 8, 1954 |

FOREIGN PATENTS

| | | |
|---|---|---|
| 45,196 | Denmark | Jan. 25, 1932 |